Figure 1:
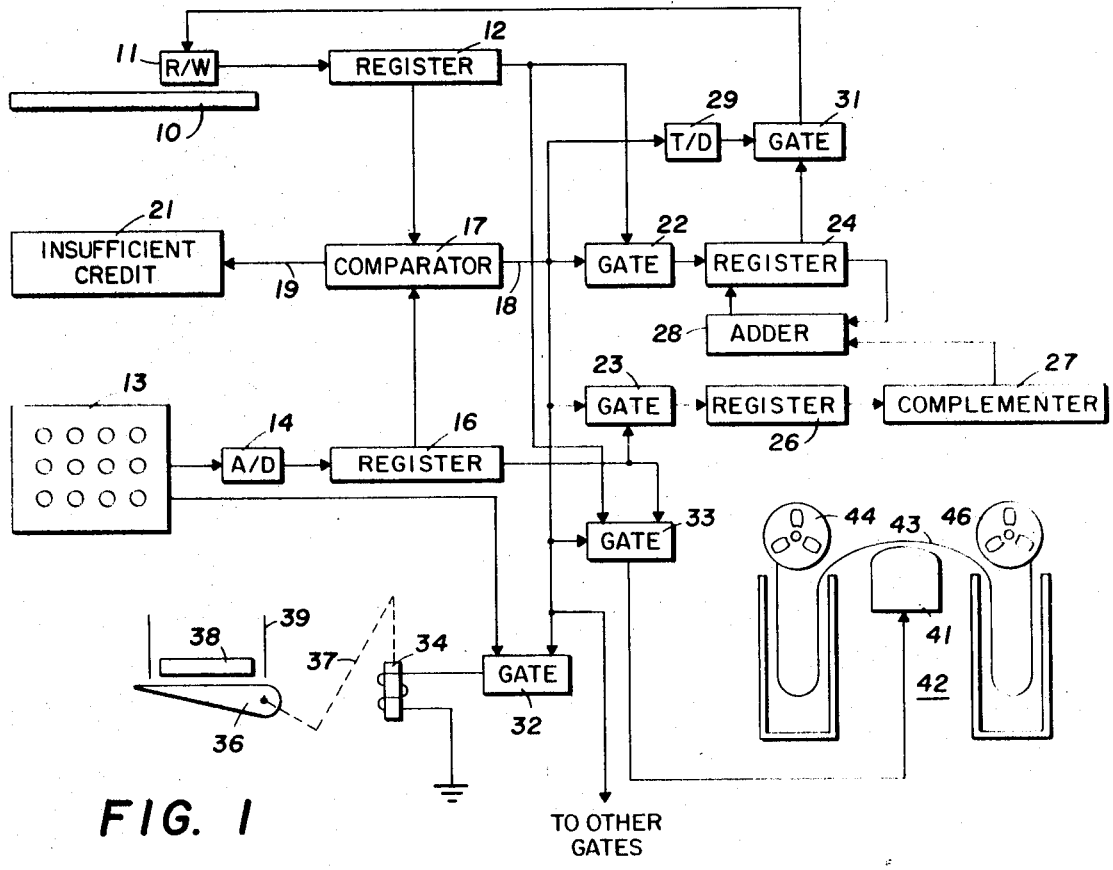

United States Patent

[11] 3,602,695

| [72] | Inventor | Bruce Boss<br>Dallas, Tex. |
| --- | --- | --- |
| [21] | Appl. No. | 646,999 |
| [22] | Filed | June 19, 1967 |
| [45] | Patented | Aug. 31, 1971 |
| [73] | Assignee | Docutel, Inc.<br>Dallas, Tex. |

[54] DOCUMENT-CODING METHOD AND APPARATUS
12 Claims, 2 Drawing Figs.

[52] U.S. Cl. .................................................. 235/61.7,
340/149, 194/4
[51] Int. Cl. ....................................................... G07f 7/02,
G06k 17/00, H04q 3/58
[50] Field of Search............................................ 235/61.71,
61.7, 61.11 R; 340/149 A; 194/4

[56] References Cited
UNITED STATES PATENTS

| 1,385,788 | 7/1921 | Kirshner...................... | 235/61.11 |
| 3,015,087 | 12/1961 | O'Gorman.................... | 340/149 A |
| 3,039,582 | 6/1962 | Simjian........................ | 194/4 |
| 3,124,674 | 3/1964 | Edwards....................... | 235/61.1 |
| 3,204,741 | 9/1965 | Maxwell ...................... | 194/4 |
| 3,221,304 | 11/1965 | Enikeieff...................... | 340/149 A |
| 3,234,358 | 2/1966 | Dashew....................... | 235/61.1 |
| 3,353,006 | 11/1967 | Pollock ....................... | 340/149 A |
| 3,355,576 | 11/1967 | Childers ...................... | 235/200 |
| 3,394,246 | 7/1968 | Goldman..................... | 235/61.7 |
| 3,419,881 | 12/1968 | Yamamoto................... | 340/149 AX |
| 2,357,455 | 9/1944 | Bryce .......................... | 235/61.9 |
| 3,501,622 | 3/1970 | Weir............................ | 235/61.11 |

*Primary Examiner*—Daryl W. Cook
*Assistant Examiner*—Robert M. Kilgore
*Attorneys*—Richards, Harris & Hubbard, V. Bryan Medlock, Jr. and Harold E. Meier

ABSTRACT: A system employing document coding includes a first means for storing data read from an encoded document and a second means for storing a code generated independently of the document data. The codes stored in the first and second means are compared and a comparison signal is generated when a relation of one sense exists between the document data and the independently generated code. A new code is generated in response to the comparison signal and transferred to a document while simultaneously, in response to said comparison signal, performing a second desired function.

PATENTED AUG 31 1971    3,602,695

INVENTOR

BRUCE BOSS

Richards, Harris & Hubbard

ATTORNEY

DOCUMENT-CODING METHOD AND APPARATUS

BACKGROUND OF THE INVENTION

Prior Art

In recent years, the growth in vending machines has necessitated the development of paper-currency-operated machines. Primarily, the need for currency-operated machines results from a desire to vend more costly merchandise. Coin-operated machines have generally been limited to vending items costing less than one dollar. There has been a need for vending machines which will be responsive to a credit card or similar document in transactions where denominations in excess of one dollar are involved.

In known currency-operated vending machines, testing devices determine the genuineness of the currency presented to the machine. Similarly, provision has been made for determining the authenticity of a credit card prior to dispensing an item of value. With credit cards, however, additional safeguards must be employed to prevent excessive charges being placed on a given account by unauthorized or fraudulent use of a credit card. Further, a credit card may be employed for carrying out controlled operations other than those in which such cards are conventionally employed.

The present invention relates to a system that checks both the genuineness of a credit code and reflects the amount of charges already placed on an account. The credit card may carry the customer's name and account number in embossed or debossed letters as is the present practice. In addition, the credit card may carry coded data which includes an account number and a credit record, either a limit or a code of past purchases or authorizations.

For example, a customer may apply for a given amount of credit. A credit card is then issued which contains, in coded form, a credit limit. The credit card might be encoded in human readable form or in only machine readable form. Means are then provided which receives such card whereby each time the customer makes a purchase with his credit card, the amount of the purchase is reflected in a new code placed on his card. For example, if the card is inserted into a machine for the purchase of an item which exceeds the coded credit limit, the credit card is rejected by the machine and the purchase will not be made.

More particularly, a document handler of the present invention includes a code reader for sensing data encoded on a document. Means are provided for generating coded data within the handler independently of the document data as by patron operation. If a comparison signal is of one sense, the patron has sufficient credit, and a signal is generated that releases a selected item and causes a new code to be generated which represents the patron's new credit status. The new code is either stored on the document presented by the customer or applied to a new document which is released to the customer. The present invention is directed to a system which, in response to a comparison signal transfers a new code to a document to be issued by the system and simultaneously carries out a second desired function.

SUMMARY

A document-responsive system wherein data encoded on a document is read and stored in a first means, and coded data enters the system independently of the document for storage in a second means. The data is stored in the first and second means is compared and a threshold-sensing means generates a comparison signal when the data in the first means bears a relation of one sense relative to the data in the second means. In response to the comparison signal, a new code is encoded on a document that is released from the system while a second function is initiated in response.

THE DRAWINGS

Figure 2:
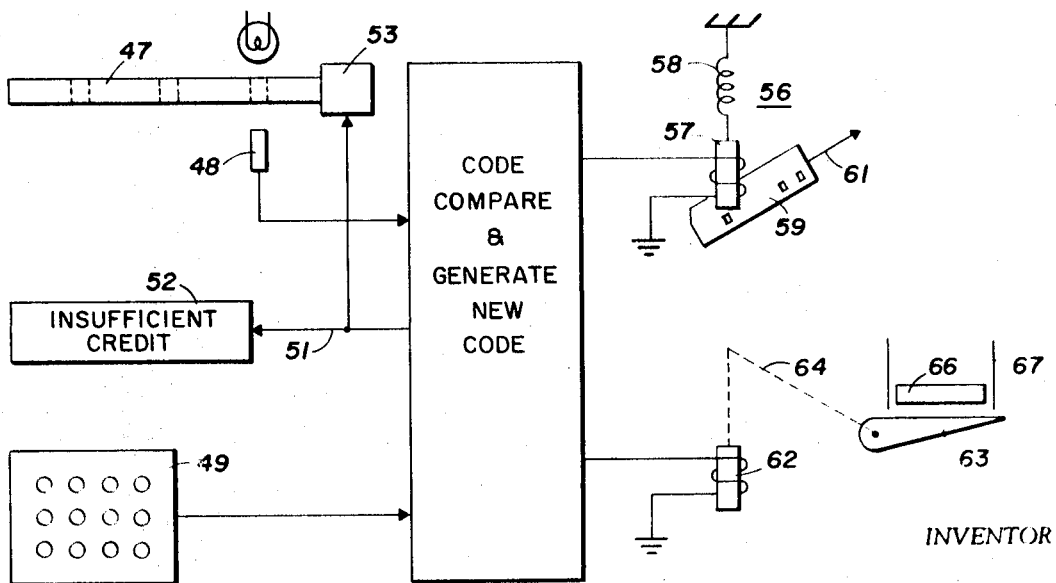

FIG. 1 is a block diagram of a logic system for use with a document having a changeable magnetic code; and FIG. 2 is a block diagram of a logic system for use of a punched hole document.

THE PREFERRED EMBODIMENTS

In FIG. 1, a system is shown wherein a patron may insert a credit card having a charge limit encoded thereon. At the same time selection of a purchase is entered by a pushbutton in the system. The cost of the item is compared with the credit limit and if within the limit, the item is dispensed and the credit limit is altered to reflect the purchase.

More particularly, the system is responsive to a credit card 10 having pertinent data encoded thereon.

The document, i.e., a credit card, can have any desired shape and the code may be stored either magnetically, by means of punched holes, or by any one of many well-known coding means. For magnetic storage of a code, a particularly well suited device is described in the copending U.S. Pat. application, Ser. No. 431,951, filed Feb. 11, 1965, and assigned to the same assignee.

The data encoded on the card 10 may be in any one of a number of configurations. For example, it may be in the form of a series of discrete magnetized zones or an arrangement of punched holes. A suitable card for magnetic storage is disclosed in the copending U.S. Pat. application, Ser. No. 431,951, dated Feb. 11, 1965, now U.S. Pat. No. 3,460,118. A read-write head 11 is positioned to respond to the magnetized zones on the card 10. The read-write head 11 may include a high-gain read amplifier responsive to low level pulses that are amplified and shaped into a pulse train of predetermined amplitude. The read-write head 11 also includes a write amplifier which accepts a pulse train of data at its input and generates current pulses to magnetize the recording media on the card 10.

In FIG. 1 the pulse train from the read amplifier of the read-write head 11 is serially transferred to a shift register 12 wherein it is stored.

A patron placing card 10 in the system under the read-write head 11, also may select a purchase from a console 13 containing a series of selection pushbuttons each associated with a different item of purchase. The console 13 includes momentary contact switches connected to individual power supplies having different levels of input voltage. A patron makes his selection from the console 13 by actuating one of the pushbuttons thereby generating an analog voltage signal which is applied to an analog-to-digital converter 14 wherein it is converted into a pulse train similar to that generated by the read-write head 11. Both mechanical and electrical analog-to-digital converters are well known in the art. A typical electronic analog-to-digital converter compares the analog signal with a ramp voltage. A pulse generator generates a series of equally spaced pulses during the time required for the ramp voltage to change from a starting level to the level of the analog voltage. Thus, the number of pulses generated before the ramp voltage equals the analog voltage is proportional to the analog voltage level. A simple counter circuit converts the pulse train into an appropriate code.

The code from the analog-to-digital converter 14 is transferred to a shift register 16 and stored therein. Two codes are now stored in the system, one in the shift register 12 and the other in the shift register 16. The two codes are applied to a comparator circuit 17 that generates a comparison signal if the code in the register 12 represents a credit greater than the cost code in the register 16. The comparator 17 may be an arrangement of OR gates and AND gates to produce a logic ONE on line 18 when the code stored in the register 12 represents a credit greater than the cost code stored in register 16 and produce a logic ONE signal on line 19 when the cost code stored in register 16 is greater than the credit stored in register 12. In the latter case, that is, where insufficient credit remains in the customer's account as indicated by the data on his card 10, the logic ONE signal on line 19 actuates a display 21 which visually indicates to the customer that the transaction will not be completed.

When sufficient credit remains in the customer's account to cover the item selected, a logic ONE signal on the line 18 closes gates 22 and 23 to transfer the codes stored in the registers 12 and 16 to registers 24 and 26, respectively. The registers 12, 16, 24 and 26 are of the type described in numerous texts wherein a plurality of serially connected flip-flop circuits have two stable states. A pulse train representing a given code is serially transferred through each of the flip-flop circuits until they each hold one bit of the shifted code. For a four-bit code, the registers have four serially connected flip-flop circuits.

Since the code stored in the register 24 represents a credit greater than the cost stored in the register 26, the cost in the latter register is subtracted from the credit in the former. Digital codes are subtracted by adding the complement of the subtrahend to the minuend. The cost in the register 26 is transferred to a complementer 27 wherein the complement of the code is generated. The output of the complementer 27 is connected as one input to an adder 28 having as a second input the credit from the register 24. The output of the adder 28 is the difference between the credit read from the card 10 and the cost generated by the analog-to-digital converter 14. This output of adder 28, a pulse train, is shifted into the register 24 which has been previously cleared.

In addition to closing the gates 22 and 23, the logic ONE signal on line 18 closes a gate 31 after introduction of a time delay 29. The time delay 29 introduces a preset delay into the signal on line 18 to provide time for the subtraction operation previously described to be completed. After the delay, the signal on line 18 closes the gate 31 thereby transferring the difference code from the register 24 to the write amplifier of the read-write head 11. The write amplifier stores the difference code, a new credit, on the document 10 thereby replacing the code that initially appeared thereon.

The coded data now stored on the document 10 represents a new credit to which the customer is entitled. As should be apparent, credit purchasing from a system in accordance with this invention eliminates the possibility of excessive unauthorized charges. The patron, when applying for a credit card, is given a credit limit through a credit code on a card.

In FIG. 1, upon closing of gates 22 and 23, the logic ONE signal on line 18 also gates 32 and 33. The gate 32 is connected to a solenoid 34 mechanically coupled to a rotating plate 36 by means of linkages 37. Closing of the gate 32 energizes the solenoid 34 with the analog voltage signal generated by the patron at the console 13 thereby rotating the plate 36 to dispense an item 38 from a chute 39. The item 38 selection is completed by the patron by the initial actuation of a pushbutton in the console 13. A like circuit corresponding with gate 32, solenoid 34, plate 36 and chute 39 is provided for each of the items selectable from the console 13. Although all the gates 32 would be closed by the logic ONE signal on line 18, only that gate receiving a signal as by line 40 from the console 13 would energize its associated solenoid 34. Since the pushbuttons in the console 13 are closed only momentarily, the gate 32 includes a storage circuit, such as a capacitor, in which the analog voltage is stored.

Closing of gate 33 shifts the codes stored in registers 12 and 16 to the recording head 41 of a recorder 42. The recorder 42 is illustrated in FIG. 1 as a magnetic tape recorder; however, it should be understood that numerous other recording devices could be employed. The code shifted from the registers 12 and 16 is stored on the magnetic tape 43 as it unwinds from reel 44 onto reel 46. The tape on reel 46 contains a permanent record of all purchase transactions completed by the system described including the customer's credit card number, the amount of each purchase, and the amount of credit before a purchase. The reel 46 is periodically removed and employed in an appropriate reader to bill each patron. Although a lost or stolen credit card may be used, liability may not exceed the limit of the coded credit. As described previously, the system eliminates excessive charges being placed on an account.

In FIG. 2, a document 47 contains a punched hole code. Document 47 is presented by a patron for the purpose of making a purchase. Punched hole codes are read either by light-sensing means of by a finger contact passing through the punched holes and making contact with a contact plate. The photocell method of punched hole reading is considered superior and is much faster. The output, upon use of either method of reading, is a digital code representative of the data stored on the document 47.

The credit on the document 47 is sensed by a reader 48 and transferred to a system similar to that shown in FIG. 1 wherein it is stored in a shift register. The patron makes a selection from a console 49 thereby generating data independent of that sensed by the reader 48. The independently generated data is also stored in a shift register. A comparison is made between the credit code on the document 47 and the cost code to complete the purchase selected by the customer at the console 49. If the cost exceeds the credit, a logic ONE signal is generated on line 51 to energize an indicator 52 which notifies the patron of insufficient credit. The logic ONE signal on line 51 also actuates a document release device 53 which returns the document 47 to the patron.

On the other hand, if the comparison indicates sufficient credit a logic ONE signal is generated to initiate a subtraction of the independently generated code from the code sensed by the reader 48. This subtraction operation is performed by adding the complement of the independently generated code to the code generated from the data on the document 47. As a result of the subtraction operation, a new code is generated which represents a new limit of credit for the patron. The new code is serially transmitted over a line 54 to a card punch 56.

The punch 56 includes a solenoid-driven punch bar 57 spring loaded by means of a spring 58. A card 59 is positioned under the punch 56 and moves in the direction of the arrow 61 in synchronism with the pulse train being transmitted over line 54. Each pulse on line 54 energizes the solenoid-driven punch 57 and appropriately spaced holes are punched in the card 59. The punched holes in the card 59 represent in coded form the new credit limit to which the patron is entitled. After the last hole is punched in the card 59, it is released to the patron for use in a subsequent purchase.

With the subtraction operation, the logic ONE signal, generated upon sufficient credit, closes a gate and a solenoid 62 is energized. The solenoid 62 is mechanically connected to mechanical gate 63 by means of linkages 64. Energizing the solenoid 62 causes the gate 63 to rotate and an item 66 is dispensed from a chute 67. As mentioned in the discussion with reference to FIG. 1, there is a solenoid 62, gate 63, and a chute 67 containing an item 66 for each of the 12 selections possible on the console 49. The particular solenoid 62 that is energized by the logic ONE signal is determined when the patron makes his selection from the console 49.

Although not shown in FIG. 2, a record of each purchase transaction is made by the system as was described with reference to FIG. 1. The Code Compare and Generate New Code block of FIG. 2 may include all the component parts of the system of FIG. 1 not specifically set forth in FIG. 2.

Whereas in FIG. 1 the document 10 was returned to the patron after a new code was stored thereon, with the system of FIG. 2 a new card is issued after each purchase. The patron presents his appropriately punched card to the system for a purchase after which it is stored in the machine for future use or destruction. The machine releases the new card 59 containing coded data representing the new amount of credit to which the patron is entitled.

While several embodiments of the invention, together with modifications thereof, have been described in detail herein and shown in the accompanying drawings, it will be evident that various further modifications are possible in the arrangement and construction of its components without departing from the scope of the invention.

I claim:
1. A method of document coding comprising:
   sensing a credit limit from data encoded on said document, storing the credit limit data sensed from a presented document in a first means, storing article coded data introduced into said system independently of said document in a second means, comparing the contents of said first and second means, generating an article-dispensing signal when the data in said first means bears a relation of one sense to the data in said second means, combining the data stored in the first means with the second means in response to the generated signal thereby producing new coded data, and coding said presented document in response to said article-dispensing signal with said new data and releasing said document from the system.

2. The method of claim 1 including the step of printing the generated signal on a permanent record for storage in said system.

3. The method of claim 1 including the step of generating a second sense signal when the data in said first means bears a relation of a second sense to the data in said second means, and rejecting the coded document in response to a second sense signal.

4. The method of claim 1 including the step of dispensing an object identified by the independently generated data.

5. In an article-dispensing system actuated by a coded document, comprising:

a reader for sensing a credit limit from encoded data on said document and for generating a credit limit code, means for generating an article code representing an article selected to be dispensed, means for comparing the credit limit code with the generated article code and producing an article-dispensing signal where the credit limit code exceeds the article code, means responsive to the article-dispensing signal for subtracting the article code from the credit limit code to reflect the selected article and thereby reduce the credit limit, means for recoding said document with the encoded data representing the reduced credit limit, and means responsive to the article-dispensing signal to release the selected article from the dispensing system.

6. In an article-dispensing system as set forth in claim 5 including:

means for generating a reject signal when a comparison of the credit limit code with the generated article code bears a relationship such that the article value exceeds the credit limit value, and means responsive to the reject signal to indicate said document is not acceptable to the system.

7. In an article-dispensing system as set forth in claim 5 wherein said reader is sensitive to magnetic data encoded on said document.

8. In an article-dispensing system as set forth in claim 5 wherein said reader is light responsive and the data on said document is in the form of punched holes.

9. In an article-dispensing system as set forth in claim 5 wherein the modified data is applied to a document in the form of a series of punched holes.

10. In an article-dispensing system actuated by a coded document, comprising:

a reader for sensing a credit limit from encoded data on said document and for generating a credit limit code, means for storing the credit limit code from said reader, means for generating an article code representing an article selected to be dispensed independently of said document, means for storing the generated article code introduced into said system independently of said document, means for comparing the contents of said first and second storing means and producing an article-dispensing signal when the credit limit exceeds the article value, means responsive to the article-dispensing signal for subtracting the article code in the second storing means from the credit limit code in the first storing means to reflect the selected article value to thereby reduce the credit limit, means responsive to the article-dispensing signal for applying encoded data representing the new credit limit to said document and for releasing said document from the system, and means responsive to the article-dispensing signal to release the selected article from the dispensing signal.

11. In an article-dispensing system as set forth in claim 10 including:

means for generating a reject signal when the code in said second storing means representing the value of an article selected is greater than a code in said first storing means representing a credit limit value, and means responsive to the reject signal to indicate the document is unacceptable to the system.

12. In an article-dispensing system as set forth in claim 10 including means for permanently storing in the system data from said first and second storing means.

UNITED STATES PATENT OFFICE
CERTIFICATE OF CORRECTION

Patent No. 3,602,695　　　　　　　Dated August 31, 1971

Inventor(s) Bruce Boss

It is certified that error appears in the above-identified patent and that said Letters Patent are hereby corrected as shown below:

Column 5, line 15, after "printing" should read -- the data stored in the first means and data stored in the second means in response to --.

Signed and sealed this 17th day of October 1972.

(SEAL)
Attest:

EDWARD M. FLETCHER, JR.　　　　　　　ROBERT GOTTSCHALK
Attesting Officer　　　　　　　　　　Commissioner of Patents

Disclaimer 3,602,695.—*Bruce Boss,* Dallas, Tex. DOCUMENT CODING METHOD AND APPARATUS. Patent dated Aug. 31, 1971. Disclaimer filed Jan. 5, 1983, by the assignee, *Docutel Corp.*

Hereby enters this disclaimer to all claims of said patent.
[*Official Gazette March 15, 1983.*]